United States Patent [19]

Judy

[11] 4,270,614
[45] Jun. 2, 1981

[54] STONE RAKE AND GROUND CONDITIONING MACHINE

[76] Inventor: James W. Judy, Box 236, Middletown, Va. 22645

[21] Appl. No.: 861,367

[22] Filed: Dec. 16, 1977

[51] Int. Cl.³ ............................................ A01B 43/00
[52] U.S. Cl. ........................................ 171/63; 56/400
[58] Field of Search .................................... 171/63–65, 171/14, 15, 89; 172/705–707, 540–544, 548, 554; 56/400, 219–227

[56] References Cited

U.S. PATENT DOCUMENTS

| 2,485,057 | 10/1949 | McCormick | 172/554 |
| 2,652,673 | 9/1953 | Zehren | 171/63 |
| 2,691,933 | 10/1954 | Emerson | 172/548 |
| 2,781,623 | 2/1957 | Anderson | 171/63 |
| 2,938,586 | 5/1960 | Gaffney | 171/63 |
| 2,987,867 | 6/1961 | Nicholson | 56/400 |
| 3,045,414 | 7/1962 | Scheidenhelm | 56/221 |
| 3,148,494 | 9/1964 | Scheidenhelm | 56/400 |
| 3,171,243 | 3/1965 | Johnston | 56/400 |
| 3,362,480 | 1/1968 | Barber | 171/89 |
| 3,599,724 | 8/1971 | Fraske | 171/63 |
| 3,703,060 | 11/1972 | Gradwohl et al. | 56/226 |
| 4,113,023 | 9/1978 | Baskett | 171/63 |

FOREIGN PATENT DOCUMENTS 4525111 10/1956 Fed. Rep. of Germany .......... 172/543

Primary Examiner—Robert A. Hafer
Attorney, Agent, or Firm—Breneman, Kane & Georges

[57] ABSTRACT

A tractor hitch mounted combination stone rake and ground conditioning machine including a frame and rotary member having mounted thereon a plurality of resilient tines in combination with a means for raising and lowering the rotary member with respect to the ground to allow a penetration of said resilient tines into the ground from about ⅛ of an inch to 3 inches to provide a resilient stone raking and ground preparing action which removes small stones, sticks and other materials that would otherwise interfere with a finished landscape for planting of lawn seed or other crop. The novel combination stone rake and ground conditioning machine not only removes stones at or near the surface of the ground, but also breaks up and aerates the soil while removing weeds and other plant growth that might otherwise interfere with planting operations.

31 Claims, 11 Drawing Figures

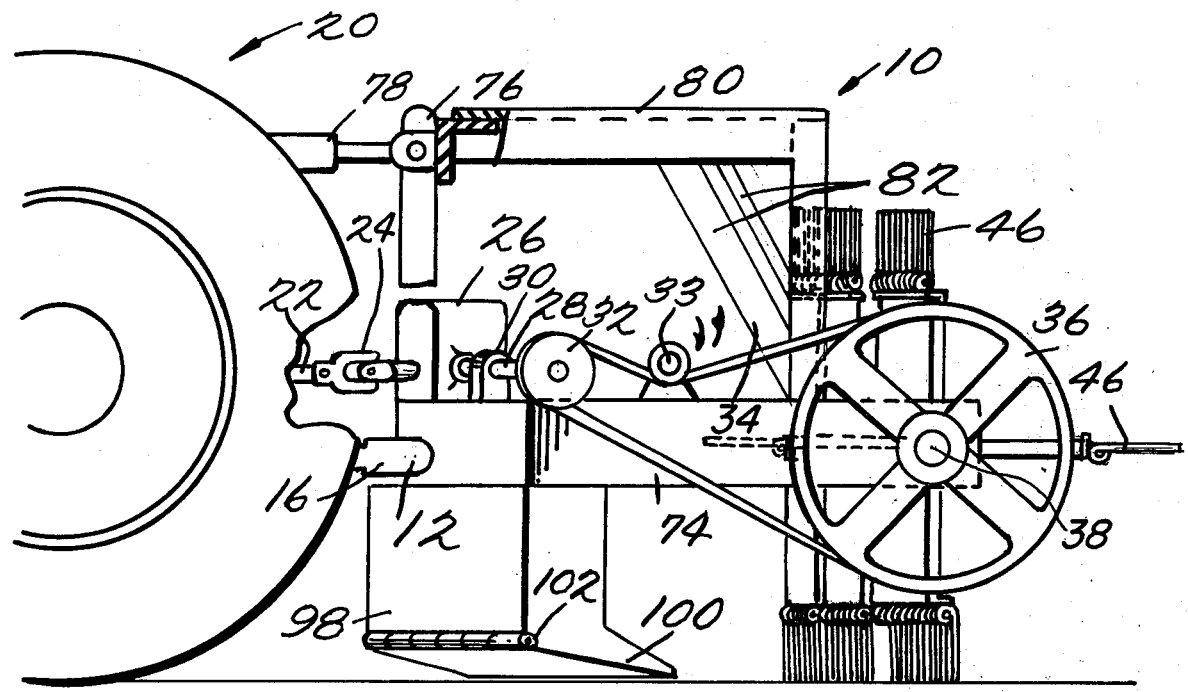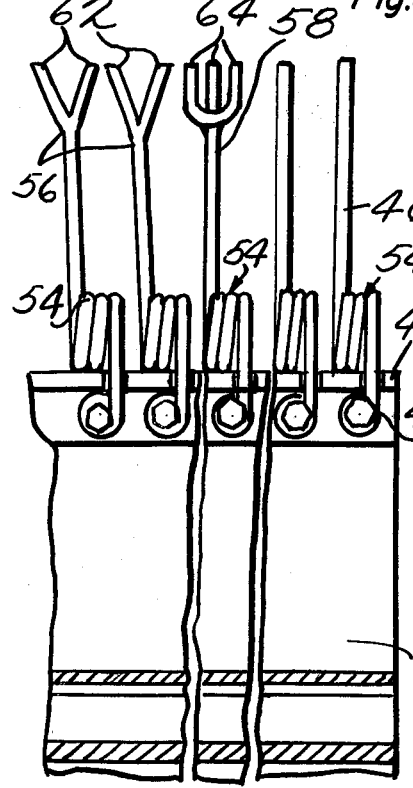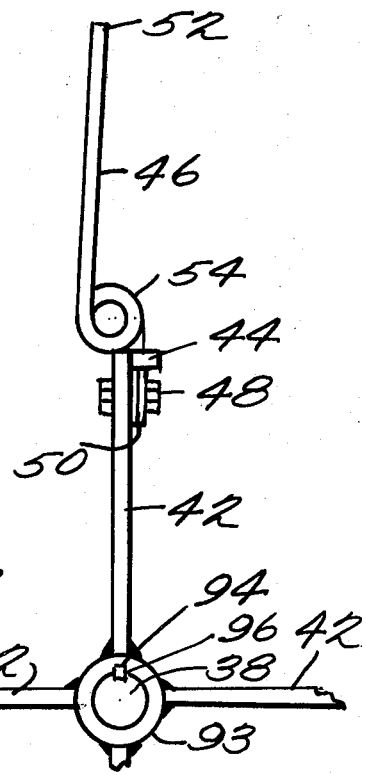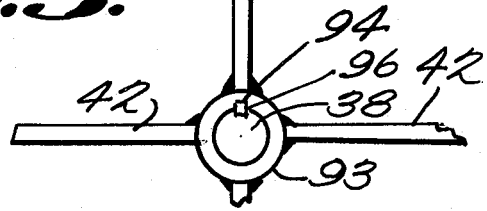

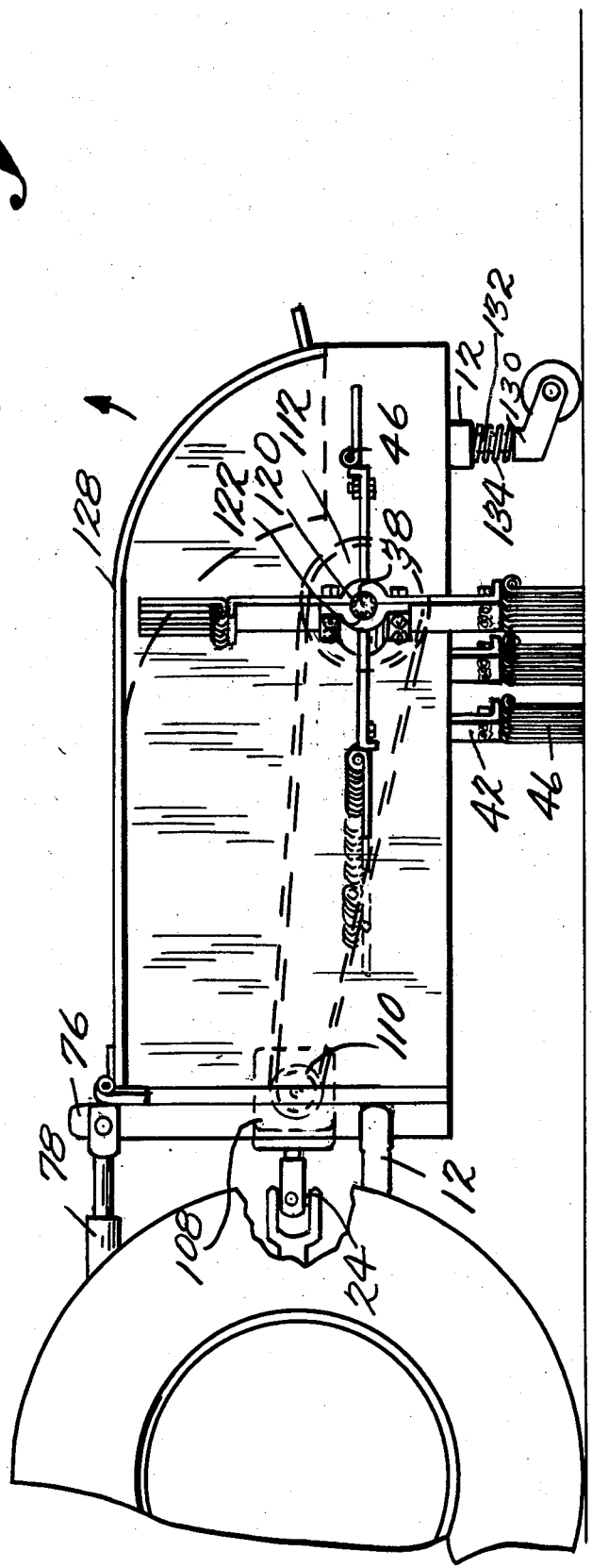

STONE RAKE AND GROUND CONDITIONING MACHINE

BACKGROUND OF THE INVENTION

1. Field of the Invention

The present invention relates to an improved combination stone rake and ground conditioning machine including tines which simultaneously remove small stones and other debris from a plowed field or lawn area while leveling and removing small plants and other material that would interfere with subsequent planting operations. More particularly, the novel machine of the present invention pertains to lawn landscaping operations for the preparation of lawn landscapes by removing stones that would otherwise interfere with seeding and subsequent mowing operations. The tractor hitch mounted combination machine is particularly adapted for residential lawn or landscape preparation by providing a combination resilient raking and ground preparation action.

2. Description of the Prior Art

A number of devices exist in the prior art for either removing rocks from prepared or unprepared fields or the subsequent conditioning or preparation of soil for planting of seed. Consequently, in the utilization of prior art devices, the landscaper has a choice of first using a rock mover to remove rocks from the landscape and then subsequently use a ground preparation device for scarifying and otherwise breaking up and conditioning the ground so that it is in a condition for the surface planting of seed for lawn or crops. In practice, however, the utilization of separate machines for stone raking and ground preparation is not economically feasible in residential landscaping nor is it desirable in all operations to remove deeply embedded rocks that will not interfere with lawn or crop operations with cumbersome machinery. As a result, in residential landscaping and garden operations, the removal of stones has been generally accomplished by hand raking with the soil thereafter being conditioned for planting by either a further hand operation or by machinery.

In the rock removal art, various devices are available which move a variety of rock sizes from at or beneath the surface of the ground. The machine in U.S. Pat. No. 2,938,586 removes rocks and stones from plowed fields by utilizing a hydraulically activated rotary member. This machine, like the device described in U.S. Pat. Nos. 2,971,587, 2,924,284 and 3,117,631 and other such prior art devices, utilize a rotary member and a means for raising and lowering the rotary member for the removal of stones, rocks andd other materials at or beneath the surface of the ground. These prior art devices, unlike the present invention, do not provide the combination stone raking and ground conditioning action of the present invention and are not tractor hitch mounted to allow operation in confined and limited areas such as encountered in the landscaping of small residential and commercial lawn operations. Such devices are more applicable to large fields and rock removal operations where subsequent soil conditioning is desirable prior to planting or seeding operation. Consequently, unlike the present invention, these machines have limited maneuverability in confined areas and do not provide the combination stone raking and ground conditioning aspects of the present invention.

There also exists in the prior art various machines for conditioning the soil prior to planting or seeding operations. Such prior art machines as represented in U.S. Pat. Nos. 2,800,065 and 2,221,221 and other arts such as represented by peanut harvesters, potato pickers, and the like involve some aspects of soil conditioning in the preparation of the ground for planting or harvesting. The soil conditioner art for planting and seeding operations as represented by the cited patents pertaining to soil conditioners do not remove debris and small rocks but instead rely upon a prior hand raking or separate mechanical raking operations to accomplish this result.

The prior art methods of removing rocks and preparing the soil have consequently shared the disadvantage of requiring a two-step operation, which first requires the removal of rocks, debris and other materials from a roughly plowed field or lawn area, and which then requires a separate soil scarifying or aerating procedure to prepare the soil for seeding, planting or other applications involving the growth of crops or lawns.

The prior art machines heretofore described have not found widespread application to residential landscaping operations since the operation of such equipment is either too expensive or cumbersome to justify its application to residential lawn and gardening. In residential and small commercial landscaping sites, hand labor has been employed for raking and removal of stone, cans, sticks and other material and debris prior to the conditioning of the soil for seeding. It will be recognized by those skilled in the art that if such small stones and rocks were not removed, such small stones, rocks and other debris would not only interfere with planting and seeding operations, but would present a hazzard in subsequent mowing operations since such small stones are often caught up in a rotary mower to thereafter be propelled at the operator.

It has therefore been a goal of the landscaping and ground conditioning art to eliminate the hand labor necessary to remove rocks, debris and small plants that will otherwise interfere with seeding operation and at the same time put the ground in a condition for seeding. It has also been a goal to utilize lightweight machinery to accomplish this goal for use in the confined areas associated with residential and small commercial real estate development so that a tractor or other similar small vehicle may be utilized to remove small stones and prepare the ground for subsequent lawn planting or gardening operations.

SUMMARY OF THE INVENTION

The present invention obviates the limitations and disadvantages of the prior art by providing a combination stone rake and ground conditioning machine for use in confined and other limited areas for raking stones and other debris from plowed, bulldozer leveled or otherwise roughly leveled ground while finishing the ground by further leveling and conditioning the ground by the removal of small plants and the breaking up and aerating the soil so that it is in a condition for the planting of lawn seed or other crop. The combination stone rake and ground conditioning machine of the invention provides its advantages of a simultaneous stone raking and ground conditioning operation in residential applications by providing a tractor hitch mounted frame for direct attachment of the novel stone rake to the tractor hitch and in the preferred embodiment to a hydraulically activated tractor hitch so that the stone rake and ground conditioner may be vertically activated and adjusted in confronting relationship to the ground by the utilization of the hydraulic system of the tractor. It will be recognized that in this embodiment the rotary member of the combination stone rake and ground conditioner may be adjusted vertically with respect to the ground and the degree of raking and combined earth scarifying and ground conditioning action may thereby be controlled from the tractor by the hydraulic activation of the tractor hitch. Further advantages of the invention may be realized by utilizing a power means provided by the tractor such as a power take off unit for rotating the rotary member of the stone rake and ground conditioner. It is, of course, understood and contemplated that separate motors or other drive means may be employed to drive the rotary member having tines mounted thereon for the combined function of stone raking and ground conditioning operations.

The stone rake and ground conditioning machine is constructed for direct attachment ot the tractor hitch and preferably utilizes a frame for disposing the rotary member containing tines thereon so that the rotary member travels directly in the path of the tractor but at a transverse angle of from about 90° to 150° to allow the use of the stone rake in confined areas which are limited only by the maneuverability of the tractor. It will be further understood that the novel stone rake and ground conditioning machine may be reduced in size for use with smaller size tractors of the type ordinarily employed in residential lawnmowing operations. The stone rake and ground conditioning machine of the present invention achieves its advantages by a combination of features, one such feature involving the combination of specially constructed resilient tines which in combination with a rotary member which is rotated at from about 24 to 50 revolutions per minute in a direction opposite to the path of travel and is disposed at a transverse angle to the path of travel of the tractor. The stone raking and ground conditioning action of the novel rake is further augmented by the utilization of the resilient tines in combination with a slip clutch means to provide a raking action and ground conditioning action.

The specially constructed resilient teeth or tines are mounted on plates disposed on the rotary member. The resilient tines utilized in the combination stone rake and ground conditioner are composed of a tempered steel wire of a diameter of from about 3/16 inch to about ½ inch containing at one end a means for detachably securing the tine to the stone rake and at the other end, a tip for raking stones and scarifying or conditioning the ground for the planting of lawnseed, the tines having disposed therebetween a resilient means to enhance the raking and ground conditioning action of novel machine. Preferably, the resiliency of the tines is provided by the application of one or more coils formed in the tine wire. The novel tines may furthermore be formed flat and divided into a plurality of raking and ground conditioning tips.

The novel stone rake and ground conditioning machine may further be equipped with a stone box for the collection of the stones raked, or the stones may be allowed to remain on the ground in the form of a windrow for subsequent removal by another machine or by hand. The uniformity of rotation and raking and ground conditioning action of the novel machine may be further enhanced by the utilization of a keyed axle or means for independently adjusting sections to allow the rotary member to be divided into a plurality of sections and allow each section to be disposed at an angle to the other sections to form a helical arrangement of the sections of tines on the rotary member.

In another aspect of the invention, a gauge wheel may be employed to assist in the stone raking, ground conditioning and leveling operations for which the present invention may be utilized.

Another aspect of the invention is the removal of small stones and other debris that would otherwise interfere with mowing operations of the lawn.

Other such objects and advantages of the present invention will become apparent to those skilled in the art from the specification in conjunction with the appended drawings which discuss and illustrate advantages resulting from the construction and operation of the novel stone rake and soil conditioning machine.

DESCRIPTION OF THE DRAWINGS

FIG. 2 is a side elevational view of the stone rake and ground conditioner including a rock collecting attachment;

FIG. 3 is a fragmentary section of a plate attached to the rotary member illustrating an arrangement of resilient tines and one embodiment of resilient tines;

FIG. 3A is a fragmentary section of a plate attached to a rotary member illustrating an alternative embodiment of the resilient tines;

FIG. 3B is a fragmentary section of a plate attached to a rotary member illustrating a further embodiment of the resilient tines.

FIG. 4 is an end view of FIG. 3;

FIG. 5 is a perspective view of an alternative embodiment of a tine constructed in accordance with the invention;

FIG. 6 is a side elevational view of an alternative embodiment of the novel stone rake and ground conditioner;

FIG. 9 is a side view of a modification of the disposition of the plates on the novel stone rake and ground conditioner.

DETAILED DESCRIPTION OF THE INVENTION

Figure 1:
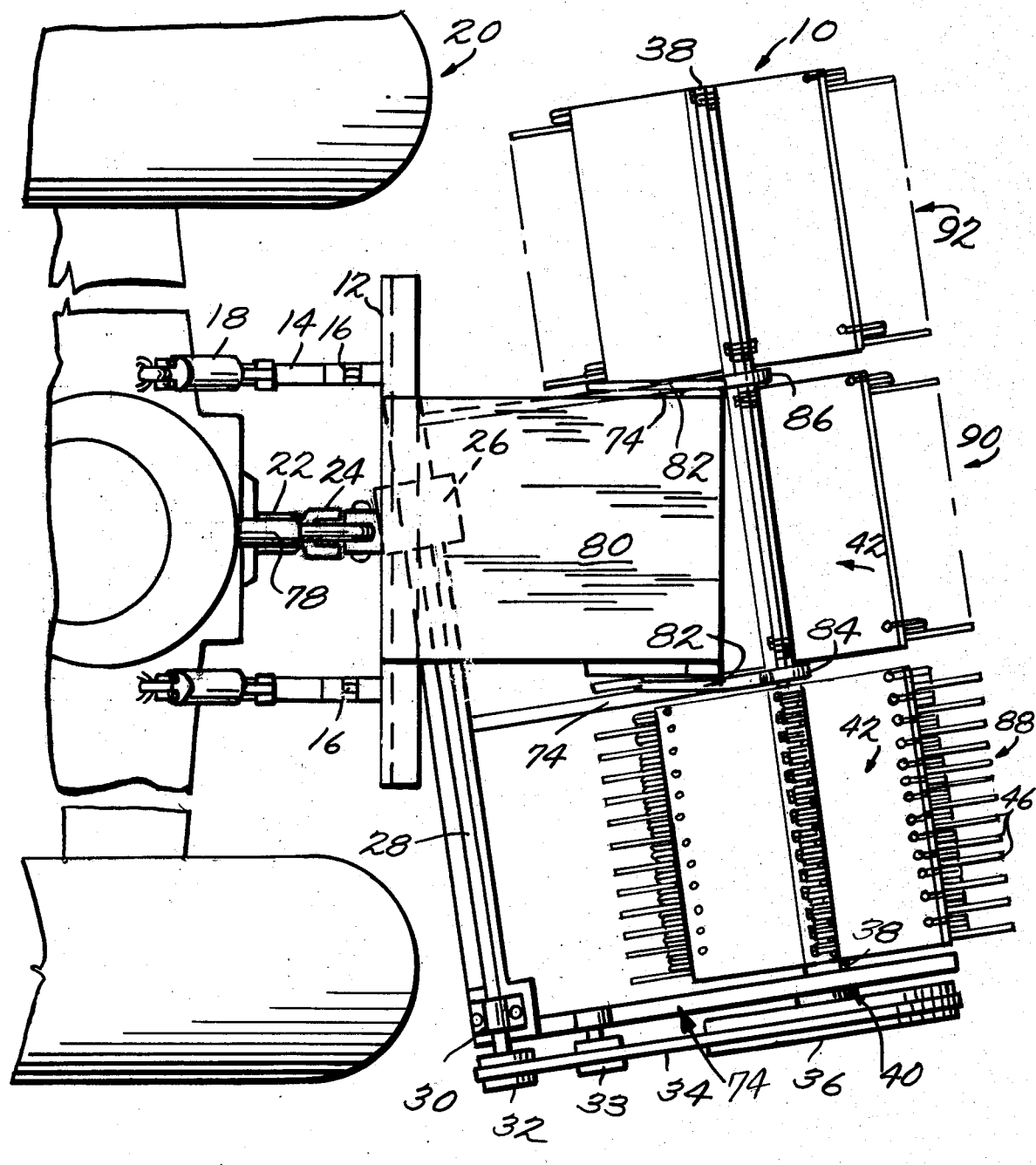
FIG. 1 is a top plan view of one of the embodiments of the novel combination stone rake and ground conditioner, some parts of which are illustrated in phantom which would be otherwise hidden detail.

Referring now to FIG. 1 of the drawing and reference numerals therein, one embodiment of the stone rake and ground conditioning machine 10 is illustrated having a frame 12 adapted for direct attachment to a tractor hitch 14 which in the drawing is accomplished by using sleeves 16 in frame 12 for receiving tractor hitch 14. Tractor hitch 14 in the preferred embodiment of the invention includes a hydraulically activated mechanism 18 for raising and lowering the novel stone rake and ground conditioning machine 10.

The tractor 20 preferably includes a power takeoff mechanism 22 to provide power through a conventional universal joint 24 to a gear box 26 disposed on the stone rake frame 12. Gear box 26 includes therein a number of gears (not shown) which transfer power to a drive shaft 28 maintained in relation to the frame by a bearing 30 disposed on frame 12. Drive shaft 28 mounts a drive pulley 32 which in conjunction with a drive belt 34, a tension pulley 33 mounted on frame 12 and a driven pulley 36 provides a type of a slip clutch driving mechanism for driving a rotary member 38 disposed on the stone rake frame 12. It will be recognized that the combination of drive ratios from tractor 20 as translated through gear box 26 and the combination of pulley sizes 32 and 36 will effect the speed of rotation of the rotary member 38 and that variable speeds of the rotary member may be provided by utilizing a tractor with a variable power takeoff unit on tractor 20 or variable gear sizes in gear box 26 along with and means for shifting gears in gear box 26 to provide a stone rake which is adaptable to varying soil conditions and soil conditioning operations which can be modified in conjunction with the number of stones to be raked and the condition and desired conditioning of the ground. It has been found that in the preferred application that the combination drive ratio, gear box and power takeoff preferably provides a rate of rotation for the rotary member in a range of about 25 revolutions per minute to 50 revolutions per minute.

Rotary member 38 is rotatably secured to frame 12 by a bearing 40. In one embodiment of the invention, the rotary member 38 is divided into three independent sections having fixed steel plates 42 secured thereon. Referring now to FIG. 1 in conjunction with FIGS. 3 and 4, it will be seen that plates 42 may either terminate in a notched strip or alternatively include a notched bar 44 to provide support for the attachment of the combination ground conditioning and raking teeth 46. It will be further recognized that the notched plate or portion 44 provides not only support for teeth 46 but allows their resiliency to be only in a direction substantially parallel to the direction of travel of the tines 46 during the rotation of rotary member 38. Tines 46 are detachably secured to plate 42 and notched bar 44 by a bolt 48 for securing said tines 46 and notched bar 44 to the plate 42. Tines 46 in their combined stone raking and ground conditioning action are designed to penetrate the ground to a depth of about ½ inch to 3 inches depending of course on the desired ground condition and raking action to be achieved by the stone rake. The resilient tine 46 in one embodiment is composed of a tempered steel wire of about 3/16 inch to about ½ inch providing a securing loop 50 at one end for securing tine 46 to plate 42 as shown in FIG. 3. At the other end of tine 46 is a tip 52 designed for the combined stone raking and ground preparing action of the novel stone rake. Intermediate, the ends 52 and securing loop 50 is one or more loops 54 to provide resiliency to the tine 46 and as shown in FIG. 3. Tines 46 are disposed at about 1 to 4 inches apart along the length of plate 42 and the resiliency provided by loops 54 in combination with the slip clutch arrangement provided by pulleys 32 and 36 along with belt 34 provide a resilient raking and ground preparing action that leaves a lawn area not only leveled but in a condition for subsequent seeding. In the preferred embodiment, tines 46 are disposed to provide a space there between of about 2 inches or less depending upon the size of the stones desired to be raked and the extent to which the ground is desired to be scarified and aerated for seeding operations. It will be recognized that tine 46 may be modified for closer spacing by either reducing the number of coils 54 or increasing the size of coil 54 or alternatively modifying the tip 52 of the tine 46 as is shown by tines 56 and 58 in FIG. 3. In particular, as is shown by tine 56 in FIG. 3A, the tine tip is split at the end to terminate in a two-pronged digging tip 62. Similarly, tine 58 in FIG. 3B terminates in a three-pronged tine end 64 by the welding or formation of the wire to form a three-pronged tine.

Referring now to FIG. 5 there is depicted a further embodiment of a tine 66 in which loops 54 terminate in an end portion 68 having a tip portion 70 which is at an angle of other than 180° to the portion of the wire 72 which provides for the attachment of loop end 50. The angle provided in tine 66 assists in the stone raking and ground preparation action by reducing the tendency of the tine to kick stones in the operation of the rotary member when greater downward forces are exerted by the tractor hitch on frame 12 rotary member 38 and plates 42. It will be recognized that the angle provided by loop 54 may be utilized in tines such as 46, 56 or 58 constructed in accordance with the invention. In this embodiment tip portion 70 is flattened to provide a rectangular tip portion that assists in the raking and ground conditioning action of the present invention.

The precise configuration of the tine 46 employed, of course, depends upon the nature of stones, debris and other materials to be raked in the landscaping operations in conjunction with the type of soil encountered and the degree of ground conditioning desired in the landscaping operation. It will be recognized that the configuration of the tine may be modified in relation to its combined raking and ground conditioning action which of course is related to the spacing and disposition of the tines on plate 42.

Referring now to FIGS. 1 and 2, it will be recognized that frame 12 includes three substantially horizontal members 74 one of which includes the bearing 40 as heretofore discussed and a substantially vertical member 76 which assists in the mounting of rotary member 38 at a transverse angle of about 91° to 150° to the path of tractor 20 to augment the ground conditioning and raking action of the novel stone rake. It will be recognized that the precise transverse angle resulting from the mounting of rotary member 38 utilizing portions 74 and 76 may be modified to suit particular requirements and that such modification is within the contemplation of the utilization of the present invention.

The substantially vertical portion 76 has attached thereto a stabilization bar 78 to assist in the lifting and pivoting action of the novel stone rake 10 as it is raised and lowered and ultimately the depression of the rotary member 38 into the ground. Disposed on vertical member 76 is a substantially horizontal member 80 which has depending arms 82 that are connected to horizontal portion 74 and contain additional bearings 84 and 86 (FIG. 1) for support and attachment of the rotary member 38. Member 80 comprises a convenient means for attachment of an enclosing hood or guard to prevent accidental injury from contact with rotating tines of the stone rake or the tossing of stone or other debris at the operator.

In this embodiment, rotary member 38 may be provided having disposed thereon three discrete sections 88, 90 and 92 for separate disposition and attachment to the rotary member 38. In one form of this embodiment, plates 42 may be disposed on three separate tubular sections adapted for attachment to rotary member 38 to provide sections 88, 90 and 92 which are separately removable and mountable on rotary member 38. Referring now to FIG. 4, section 88 is illustrated wherein plates 42 are disposed on a tubular section 93 having a slot 94 and a corresponding key 96 provided in rotary member 38. The combination of the slot and key arrangement allows for the disposition of sections 88, 90 and 92 in a helical configuration on rotary member 38 to further augment the raking and ground preparing action of the novel stone rake. It will be recognized by those skilled in the art that other arrangements may be utilized such as pin and hole arrangement (not shown) wherein a pin is provided on tubular sections 93 to be disposed through one or more correspondng holes provided in rotary member 38 to provide additional means for adjusting and axially disposing sections 88, 90 and 92 with respect to one another on rotary member 38.

In FIG. 2 an optional stone collecting box 98 is disposed on frame 12 to collect stones, rocks and debris as they are raked up by the stone rake tines 46 into the trailing hinged flap 100 which is attached to stone collecting box 98 by a hinge 102. Trailing hinged flap 100 is designed to trail on the ground in an overlapping relationship to rotating tines 46 as they rotate in FIG. 2 in a clockwise direction to rake stones, debris and other materials into collecting box 98. Alternatively, stone and other debris may be formed in a row on a side of the path of travel the novel stone rake and ground conditioning machine to be subsequently hand raked or otherwise removed in further landscaping operations.

Figure 7:
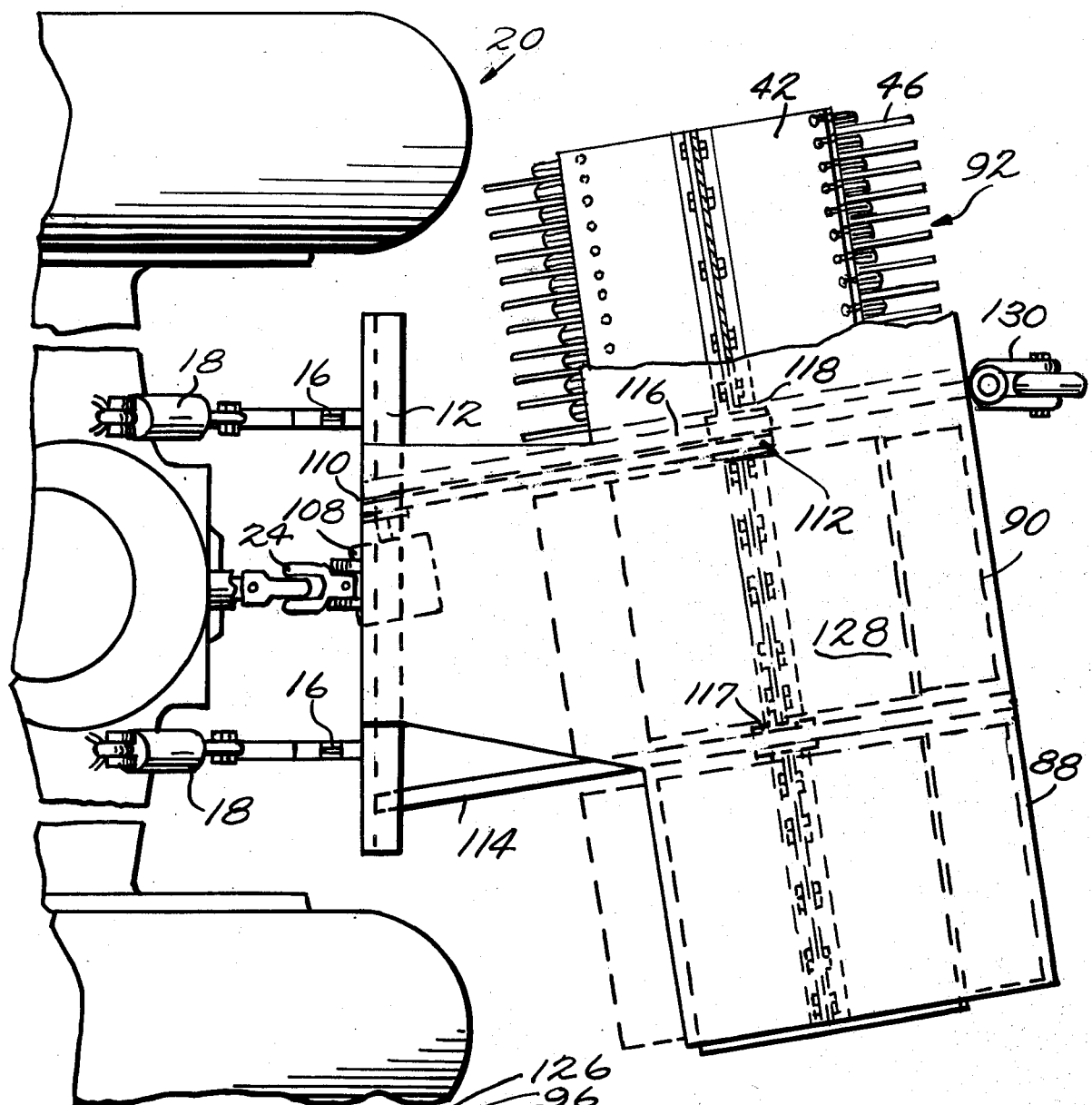
FIG. 7 is a top plan view of the stone rake of FIG. 6, part of which is broken away to illustrate additional detail.

Referring now to FIGS. 6 and 7, there is depicted a further embodiment of the present invention having a modified gear box 108 and drive arrangement of drive pulley 110 and driven pulley 112 for providing rotation of the rotary member 38 having three sections 88, 90 and 92. In this embodiment of the invention, frame 12 includes two frame members 114 and 116 that mount bearings 117 and 118 supporting rotary member 38. Sections 88, 90 and 92 are mounted on rotary member 38 by the utilization of a C-shaped clamp 120 (FIG. 6) for bolting the two halves of C-shaped clamp 120 on rotating member 38 to provide greater ease of removal and adjustment of each section on rotary member 38. To further assist in the disposition and removal of the sections 88, 90 and 92 on rotary member 38, the rotary member and the C-shaped clamp 120 may both contain teeth 122 designed for a confronting locking relationship for setting the position of the tubular section 93 having plates 42 and tines 46 on rotary member 38.

In the embodiment, as illustrated in FIGS. 6 and 7, rotary member 38 and the tines 46 contained thereon are enclosed in a hood-like guard 128 to reduce the possibility of injury from accidental contact with the tines 46 or plates 42 and the possibility of stones or other debris being propelled at the operator of the stone rake. In this embodiment, a gauge wheel 130 is attached to frame 12 to assist in the ground leveling capability of the novel stone rake by providing a more uniform spaced relationship between the stone rake and the ground where the ground being raked is unlevel or otherwise contains an uneven surface. The guide wheel 130 is preferably attached to frame 12 by means of a cylinder 132 and a heavy gauge spring 134 to assist in the uniform operation of the stone rake. As can be seen from the side view of the stone rake and ground conditioning machine in FIG. 6, the operation of the novel rake not only removes the stones to one side but also conditions the soil by breaking up the earth in such a manner as to provide a good surface for the planting of lawn while removing stones and other plant life which would otherwise interefere with planting operations.

Figure 8:
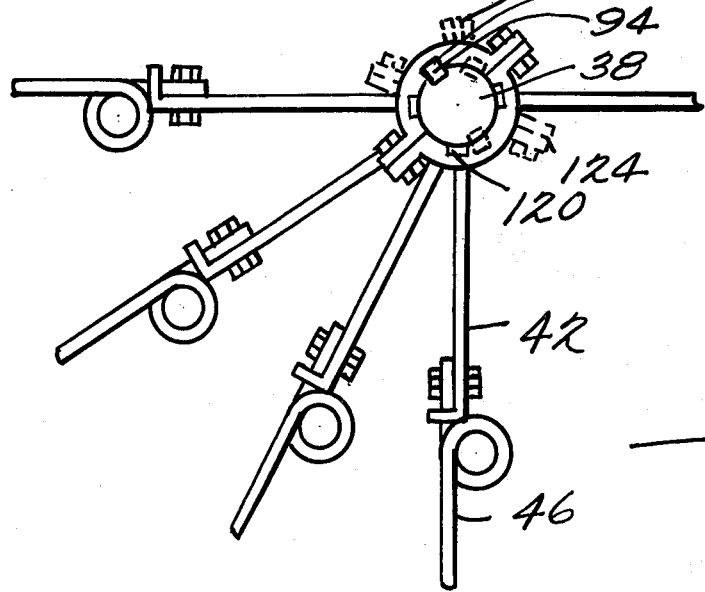
FIG. 8 is a side view of an alternative embodiment of supporting plates and tines on the rotary member.

Referring now to FIG. 8, there is depicted an alternative the slot and key arrangement for disposing C-shaped clamp 120 of section 88 on rotary member 38 with additional clamps 124 and 126 for clamping sections 90 and 92 to rotary member 38 to provide a helical disposition of the sections 88, 90 and 92 around the rotating member 38 to further assist in the smoother operation of the rotating member 38 and improve upon the ground conditioning and stone raking action of the novel machine. In FIG. 8, clamps 120, 124 and 126 are designed to utilize a slot 94 and key 96 arrangement for maintaining the sections in a fixed rotational position with respect to rotary member 38 in a manner as heretofore discussed. It will be recognized and is contemplated that additional sections or plates 42 may be disposed on rotary member 38 at angles of other than 90° to rotary member 38 to assist in smoother operation and reduce the possibility of the rotary member kicking stones at the operator. Smoother operation may further be achieved by the disposition of the sections 88, 90 and 92 in a helical arrangement to assist in the resilient raking and ground conditioning action.

Referring now to FIG. 9, an alternative embodiment for the disposition of plates 42 on rotary member 38 is depicted. In FIG. 9, six plates 42 are disposed on rotary member 38 at an angle of about 70° toward the direction of rotation of rotary member 38. In disposing plate 42 at an angle other than 90° such as between 40° and 90°, the raking and ground conditioning operation of the stone rake is improved by providing smoother operation.

The combination stone rake and ground conditioner provides operative advantages by utilizing a tractor hitch mounted frame to allow maneuverability of the rake to be limited primarily by the operational limitations of the tractor. The advantages of tractor hitch mounting is further apparent where the tractor hitch is hydraulically activated thereby utilizing the weight of the tractor to direct the force of the tines of the stone rake into the ground and control the degree of raking and ground conditioning action. In addition, as heretofore discussed, the power takeoff unit provided by most tractors may be conveniently utilized to operate the rotary member 38 in the preferred embodiment.

In operation, the novel stone rake is lowered in confronting relationship to the ground to allow the tines 46 to penetrate the ground from about ⅛ of an inch to about 3 inches depending upon the condition of the soil, and the degree of ground conditioning action desired. Tines 46 are composed of a tempered steel of about 3/16's of an inch to ½ inch having a loop 54 to provide a resilient combination raking and ground preparing action. The tines may be modified as heretofore discussed to augment their digging and raking action and depending upon the precise embodiment of the tine are generally disposed about 2 inches apart on plate 42 attached to rotary member 38 and in the preferred embodiment sections 88, 90 and 92 are helically arranged as heretofore discussed. Rotary member 38 is mounted on frame 12 at a transverse angle, preferably at 110° on one side to the path of travel of the tractor and 70° on the opposite side although other angles may be benefically employed. Rotary member is rotated in a direction opposite to the direction of travel of its frame 12 at preferably about 25 to 50 revolutions per minute with means available for additionally controlling the speed of the rotary member.

The combination of the configuration of tines 46 and the spacing of the tines on the plates 42 on rotary member 38 along with the speed of rotation, the transverse angle of the rotary member and the combination of the resiliency provided by the slip clutch and resilient construction of the tines provide an elastic digging and raking implement to yield to large stones or obstructions beneath the ground that would not interfere with crop or lawn areas while utilizing the spring formed by loops 54 to provide a whipping action which conditions the ground for planting while at the same time raking small stones, sticks and other debris for subsequent removal.

Modifications such as tines 46 and 56 in FIG. 3 and tine 66 in FIG. 5 may be utilized alone or in combination with tine 46 on plate 42 to modify the combined raking and ground conditioning action of the novel stone rake. The spacing of tines on rotary member 38 along with the transverse angle of the rotary member with respect to the path of tractor 20 serves not only to provide a side stone raking action of the combination rake but also serves to augment the ground conditioning action of the combined raking and ground preparing time. Such modifications illustrate the wide range of applicability of the present invention to a variety of ground conditions encountered and combined stone raking and ground conditioning desired in a particular landscaping operation.

The invention has been illustrated and discussed with particular reference to the arrangement of the novel stone rake with respect to the utilization of farm-size tractors for mounting the combination stone rake and ground conditioning machine and employing the power takeoff unit and hydraulic raising and lowering mechanism of the tractor in describing the novel aspects of the present invention. It will be recognized, however, by those skilled in the art that the arrangement of the power supplying means and hydraulic raising and lowering means need not depend upon power provided by the tractor and that the combination stone rake and ground conditioning machine may be modified to include a separate engine for either supplying power to the rotating member or for raising or lowering the rotating member without departing from the spirit or scope of the present invention.

It will further be appreciated and contemplated that the novel rake may be reduced in size for utilization on small tractors as are employed for residential lawn and garden operations to provide the advantages of the present invention is household stone raking and ground conditioning operations involved in residential gardening. Similarly, other substitutions and modifications may be made in the tines and novel stone rake of the present invention to suit the particular requirements of the landscaping and stone raking and ground conditioning operation encountered. Consequently, these and other modifications and substitutions may be made within the spirit and scope of the invention as defined in the following claims.

What is claimed is:

1. A combination stone rake and ground conditioning machine comprising:
   (a) a frame, said frame having at least two outwardly extending arms and means adapted for mounting said frame on a tracter hitch which provides means for vertical adjustment of said frame in relation to the ground;
   (b) a rotary member rotatably mounted and supported by said at least two outwardly extending arms disposed on said frame;
   (c) three or more plates circumferentially spaced and extending along the axial length of said rotary member;
   (d) a plurality of resilient tines mounted on said three or more plates disposed on said rotary member to provide in operation a penetration of the ground of about $\frac{1}{8}$ of an inch to about 3 inches; and
   (e) a slip clutch drive means for rotating said rotary member which in combination with said three of more plates, said rotary member and said resilient tines provide a resilient raking and ground conditioning action which removes small stones while conditioning the ground for planting.

2. The combination stone rake and ground conditioning machine of claim 1 wherein said rotary member is mounted in a transverse angle of about 91° to 150° with respect to said frame.

3. The combination stone rake and ground conditioning machine of claim 2 wherein said resilient tines are spaced at a distance of about 2 inches from one another on said three or more plates.

4. The combination stone rake and ground conditioning machine of claim 3 wherein said three or more plates are mounted in a helical arrangement on said rotary member.

5. The combination stone rake and ground conditioning machine of claim 1 wherein said slip clutch drive means for rotating said rotary member further comprises a combination of shafts, a universal joint, gears and pulleys for engagement with a power takeoff unit provided on said tractor.

6. The combination stone rake and ground conditioning machine of claim 2 wherein said rotary member includes at least three axially adjacent rotary members adapted for detachable mounting to said frame.

7. The combination stone rake and ground conditioning machine of claim 6 wherein said three or more plates are mounted on each of said rotary members at an angle of about 50° to 90° in the direction of rotation of said rotary members.

8. The combination stone rake and ground conditioning machine of claim 7 wherein said at least three rotary members mounted on said frame additionally comprises means for rotatably adjusting and individually locking each rotary member with respect to the other rotary members.

9. The combination stone rake and ground conditioning machine of claim 8 wherein said means for rotatably adjusting and individually locking said rotary member with respect to the other rotary members comprises a slot and key arrangement provided in said rotary member.

10. The combination stone rake and ground conditioning machine of claim 9 wherein said means for rotatably adjusting and individually locking said rotary member with respect to the other rotary members comprises teeth in at least one location on said rotary member with at least one set of confronting teeth in at least one portion of the shaft upon which said rotary members are rotatably mounted.

11. The combination stone rake and ground conditioning machine of claim 1 wherein each of said plurality of resilient tines comprises a tempered steel wire of about 3/16 of an inch to about $\frac{1}{2}$ inch having at one end said means for externally mounting said tine with respect to said rotary member and a tip at the other end and one or more coils disposed intermediate the ends of said tine for providing resiliency.

12. A combination stone rake and ground conditioning machine for removing stones and preparing ground for seeding comprising:
   (a) a frame adapted for direct mounting to a tractor hitch, said frame having at least two outwardly extending arms;
   (b) a rotary member rotatably mounted and disposed on said at least two outwardly extending arms of said frame;
   (c) three or more plates circumferentially spaced and extending along the axial length of said rotary member;
   (d) a plurality of resilient tines mounted on said three or more plates disposed on said rotary member;
   (e) means for vertically adjusting said rotary member in relation to the ground; and
   (f) a slip clutch drive means for rotating said rotary member wherein said combination of said means for vertically adjusting said rotary member, said three or more plates and said resiliently mounted tines provides a penetration of said tines into the ground to a depth of from about $\frac{1}{8}$ of an inch to about 3 inches to provide a resilient raking and ground preparing action while removing small stones.

13. The combination stone rake and ground conditioning machine of claim 12 wherein said tines are releasably secured to said platelike member.

14. The combination stone rake and ground conditioning machine of claim 12 wherein said rotary member includes at least three rotary member sections and wherein said rotary member sections may be rotationally adjusted and secured for rotation with respect to each other.

15. The combination stone rake and ground conditioning machine of claim 12 additionally comprising a stone and debris collecting box disposed on said frame.

16. The combination stone rake and ground conditioning machine of claim 12 additionally comprising a guide wheel mounted to said frame for assisting in the maintenance of the distance between the tines and the ground in the utilization of said combination stone rake and ground conditioning machine.

17. The combination stone rake and ground conditioning machine of claim 12 wherein said platelike members are attached to said rotary member at an angle of about 50° to 90° in the direction of rotation of said rotary member.

18. The combination stone rake and ground conditioning machine of claim 12 wherein said plurality of resilient tines are formed from a tempered steel wire of about 3/16 of an inch to about $\frac{1}{2}$ of an inch in diameter containing at one end a means for securing said tine to said stone rake and ground conditioning machine and at the other end a tip and a means for providing resiliency to said tine to provide a tine for simultaneously digging into and conditioning the ground while raking stones.

19. The combination stone rake and ground conditioning machine of claim 18 wherein said tip end of said tines comprises a plurality of tips for digging into the ground and raking stones from said ground.

20. The combination stone rake and ground conditioning machine of claim 18 wherein said means to provide resiliency is one or more coils disposed intermediate to the ends of said wire.

21. The combination stone rake and ground conditioning machine of claim 18 wherein a means is provided on said tines for bolting said tines to said three or more plates associated with said stone rake and ground conditioning machine, said tine having a right angled plate wherein the end adjacent to the means providing resiliency to said tine is attached to one side of said right angled plate and the other side of said right angled plate provides means for attachment of said tine to one of said three or more plates associated with said stone rake and ground conditioning machine.

22. The combination stone rake and ground conditioning machine of claim 21 wherein said tine having a right angled plate contains a slot for receiving a looped end of said tine for bolting said tine and said right angled plate to one of said three or more plates associated with said stone rake and ground conditioning machine.

23. The combination stone rake and ground conditioning machine of claim 18 wherein said plurality of resilient tines have an angle of about 100° to 180° between said means for providing resiliency and the tip of said tine.

24. A combination landscaping machine for conditioning the ground for planting crop and the removal of stones at or slightly beneath the surface while leveling and conditioning the ground surface for the planting of crop comprising:
   (a) a frame adapted for attachment to a tractor hitch having at least two outwardly extending arms;
   (b) a rotary member mounted on said at least two outwardly extending arms;
   (c) a tubular section mounted on said rotary member;
   (d) three or more plates circumferentially spaced and extending along the axial length of said tubular section;
   (e) a plurality of resilient tines mounted on said three or more plates disposed on each tubular section;
   (f) means for vertically adjusting said rotary member in relation to the ground;
   (g) a means including power means for rotating said rotary member; and
   (h) a drive means disposed between said rotary member and means for rotating said rotary member which in combination with means for vertically adjusting said rotary member, said plurality of plates and said resilient tines provides a penetration of the ground of about $\frac{1}{8}$ of an inch to 3 inches to result in a resilient raking and ground conditioning action which removes small stones while leveling the ground surface.

25. The combination landscaping machine for conditioning the ground for planting crop and the removal of stones of claim 24 wherein said rotary member is disposed on said frame at a transverse angle of from about 91° to 150° to the path of travel of said frame.

26. The combination landscaping machine for conditioning the ground for planting crop and the removal of stones of claim 25 wherein said tubular section are at least two in number and said tubular members are disposed on said rotary member in a plurality of separate sections.

27. The combination landscaping machine for conditioning the ground for planting crop and the removal of stones of claim 26 wherein said sections of said rotary member additionally comprises means for rotationally adjusting and locking each of said sections in a rotational relationship with respect to said rotary member.

28. The combination landscaping machine for conditioning the ground for planting crop and the removal of stones of claim 27 wherein said three or more plates are at least four plates disposed equidistantly from one another at a 90° angle on said tubular sections.

29. The combination landscaping machine for conditioning the ground for planting crop and removing stones of claim 27 wherein said three or more plates are disposed on said tubular sections at an angle of about 50° to 90° in the direction of rotation of said rotary member.

30. The combination landscaping machine for conditioning the ground for planting crop and the removal of stones of claim 24 wherein said rotary member is designed for rotation at about 25 to 50 revolutions per minute.

31. The combination landscaping machine for conditioning the ground for planting crop and the removal of stones of claim 24 wherein said drive means is a slip clutch drive means employing a combination of pulleys connected to one another by a drive belt.

* * * * *